(12) United States Patent
Crinon et al.

(10) Patent No.: US 8,571,106 B2
(45) Date of Patent: Oct. 29, 2013

(54) DIGITAL VIDEO COMPRESSION ACCELERATION BASED ON MOTION VECTORS PRODUCED BY CAMERAS

(75) Inventors: Regis J. Crinon, Camas, WA (US); Walid Ali, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1234 days.

(21) Appl. No.: 12/125,060

(22) Filed: May 22, 2008

(65) Prior Publication Data
US 2009/0290641 A1 Nov. 26, 2009

(51) Int. Cl.
*H04N 7/26* (2006.01)

(52) U.S. Cl.
USPC ..................... 375/240.16; 375/310

(58) Field of Classification Search
USPC .......................... 375/240.16, 240.12
See application file for complete search history.

(56) References Cited

U.S. PATENT DOCUMENTS

| | | | | |
|---|---|---|---|---|
| 5,734,419 | A * | 3/1998 | Botsford et al. | 348/97 |
| 6,115,076 | A * | 9/2000 | Linzer | 348/578 |
| 6,323,914 | B1 * | 11/2001 | Linzer | 348/578 |
| 6,833,865 | B1 | 12/2004 | Fuller et al. | |
| 6,876,815 | B1 | 4/2005 | McGrath | |
| 6,877,134 | B1 | 4/2005 | Fuller et al. | |
| 6,961,441 | B1 | 11/2005 | Hershey et al. | |
| 7,184,482 | B2 | 2/2007 | Prakash et al. | |
| 7,197,076 | B2 * | 3/2007 | Chang et al. | 375/240.17 |
| 7,242,716 | B2 * | 7/2007 | Koto et al. | 375/240.16 |
| 7,430,333 | B2 * | 9/2008 | Yu et al. | 382/254 |
| 7,991,224 | B2 * | 8/2011 | Andrew et al. | 382/164 |
| 8,004,538 | B2 * | 8/2011 | Alessi et al. | 345/591 |
| 8,040,558 | B2 * | 10/2011 | Dosluoglu | 358/1.9 |
| 8,280,108 | B2 * | 10/2012 | Takeuchi | 382/103 |
| 2002/0170068 | A1 | 11/2002 | Rafey et al. | |
| 2004/0114685 | A1 * | 6/2004 | Kouloheris et al. | 375/240.03 |
| 2004/0240541 | A1 | 12/2004 | Chadwick et al. | |
| 2006/0078314 | A1 | 4/2006 | Hung et al. | |
| 2006/0088210 | A1 * | 4/2006 | Yu et al. | 382/167 |
| 2006/0210175 | A1 * | 9/2006 | Huang et al. | 382/232 |

(Continued)

OTHER PUBLICATIONS

"MaxTRAQ Lite 2.08", Windows Vista Software Archive, 2006-2008, vista-files.org.

(Continued)

*Primary Examiner* — Hassan Kizou
*Assistant Examiner* — Emmanuel Maglo
(74) *Attorney, Agent, or Firm* — Hope Baldauff, LLC

(57) ABSTRACT

Architecture for accelerating video compression by using the motion vectors produced locally by a camera is disclosed. Video frames are captured by the camera (e.g., a webcam) which also computes a motion vector for the frames. Metadata can also be generated that represent an index of motion quality associated with the motion vector. The motion vector is passed to a video compression engine which selectively uses the motion vector directly or alternatively as a seed for a compression and encoding algorithm. This algorithm produces a compressed video frame representing a motion estimate having a selected motion quality index value. In this way, complexity is reduced in the video compression engine, resulting in faster and more efficient video compression. Alternatively, the webcam sends a compressed video bitstream to reduce throughput on the connection and the receiving computing system processes residual information to derive an estimate of the quality index for each macroblock/kernel.

19 Claims, 9 Drawing Sheets

(56) References Cited

U.S. PATENT DOCUMENTS

| | | | |
|---|---|---|---|
| 2006/0239509 A1* | 10/2006 | Saito | 382/104 |
| 2006/0294125 A1 | 12/2006 | Deaven | |
| 2007/0053513 A1 | 3/2007 | Hoffberg | |
| 2007/0166013 A1 | 7/2007 | Yogeshwar et al. | |
| 2007/0237210 A1* | 10/2007 | Voglewede et al. | 375/136 |
| 2008/0123945 A1* | 5/2008 | Andrew et al. | 382/164 |
| 2008/0130031 A1* | 6/2008 | Dosluoglu | 358/1.9 |
| 2009/0147854 A1* | 6/2009 | Dane et al. | 375/240.16 |

OTHER PUBLICATIONS

"Willing Webcam Lite (EXE)", Version 4.3, Willing Software, 2008.
Neogi, et al., "Compression Techniques for Active Video Content", Proceedings of the Data Compression Conference (DCC '02), IEEE Computer Society, 2002.
"MaxTRAQ Lite 2.08", Windows Vista Software Archive, vista-files.org downloaded Apr. 8, 2008 from http://www.vista-files.org/programs/innovation-systems-inc/maxtraq-lite.html.

* cited by examiner

DIGITAL VIDEO COMPRESSION ACCELERATION BASED ON MOTION VECTORS PRODUCED BY CAMERAS

BACKGROUND

In digital video, compression is used for conserving storage and for realtime downloading and viewing over the Internet. A technique used in digital video compression is block motion estimation. With block motion estimation, blocks of video samples in frames of a video stream are matched with similar blocks of video samples from adjoining frames in a sequence, such as the previous frame and the next frame.

These blocks correspond to similar sets of pixels that represent an image element in the scene captured in the frame, such as a foreground or background object, or a feature from the area of interest. From frame to frame, these blocks typically change as movement occurs in the scene, and this is represented by motion vectors associated with the blocks within the frame.

In block motion estimation, the best matches are found for blocks in each successive frame so that maximum correlation is found across blocks in consecutive frames. A small dataset representing block-to-block sample differences and the motion vectors are encoded and transmitted to the decoder. In a practical realization, a sum of the absolute video sample differences (SAD) is found and a minimum number of such SAD values is determined for a large set of candidate blocks over a range of video frames to be encoded. Block matching results in a high degree of coding efficiency, which is effectively realized as data compression.

However, motion estimation is a computationally-intensive task, which poses a problem for webcams, for example, used for realtime communications over the Internet. To offload the computation, some current webcams include a processor that performs pre-processing on video samples prior to sending to the host computer (e.g., via a USB connection). Pre-processing can be performed for basic parameters such as luminance and chrominance samples and also for more complex supporting features such as face tracking. However, the pre-processing is limited in that the webcam generates specific motion vectors which are only used in the system to support these functions.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

To that end, architecture is disclosed herewith for accelerating video compression by using the motion vectors produced locally by a camera or a webcam. Video frames are captured by the camera which also computes a motion vector associated with a block in the frame. Metadata can also be generated that represent an index of motion quality associated with the motion vector. The motion vector is passed to a video compression engine which selectively uses the motion vector directly or alternatively as a seed for a refined motion estimation algorithm in the compression and encoding algorithm. This algorithm produces a compressed video frame representing a motion estimate for the block having a selected motion quality index value. In this way, complexity is reduced in the video compression engine, resulting in faster and more efficient video compression and in lower requirements for a PC or other computing platform to perform realtime video compression.

To the accomplishment of the foregoing and related ends, certain illustrative aspects are described herein in connection with the following description and the annexed drawings. These aspects are indicative of the various ways in which the principles disclosed herein can be practiced, all aspects and equivalents of which are intended to be within the scope of the claimed subject matter. Other advantages and novel features will become apparent from the following detailed description when considered in conjunction with the drawings.

DETAILED DESCRIPTION

Figure 1:
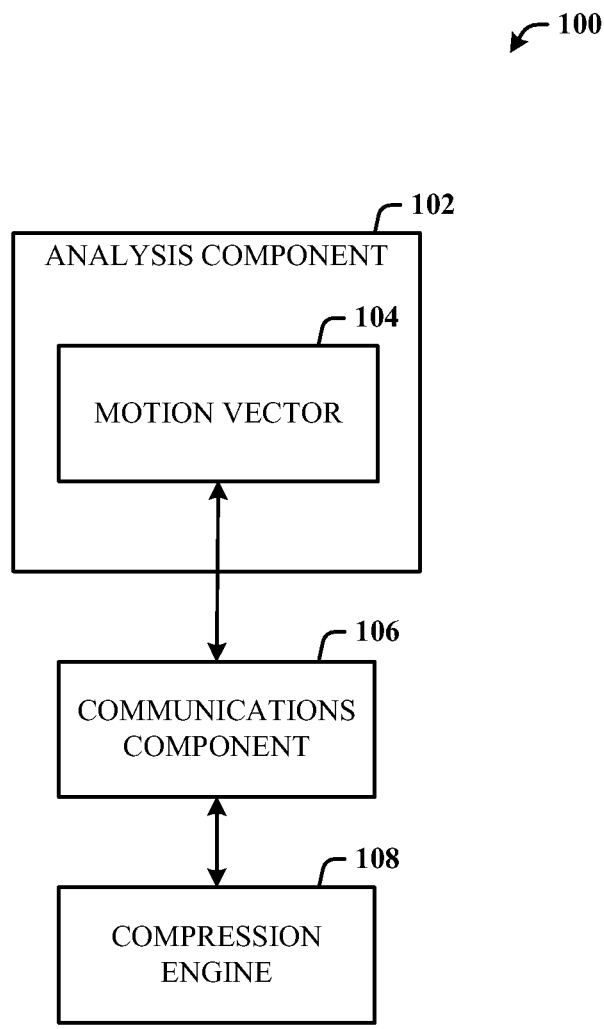
FIG. 1 illustrates an exemplary computer-implemented system for processing digital data.

The disclosed architecture relates to a computer-implemented system for processing digital data, particularly for video compression in cameras. For example, motion vectors produced by webcams can be passed on to a video compression engine for use either directly or as seeds in the compression and encoding algorithms of the engine, thereby reducing the complexity in the video compression engine. The architecture identifies a minimal set of metadata to be associated with a motion vector produced internally by the camera. The motion vectors and associated metadata sets are transmitted to the motion compression engine which then integrates this information in its motion estimation algorithm. A compressed video frame is produced that represents a motion estimate having a selected motion quality index value. The index value is then used as a means for indicating to the associated computing device the quality of the motion estimates in the camera. The computing device can then make adjustments to provide more effective results to the user.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented digital data processing system 100. The system 100 is especially intended for performing data compression on a digital video stream, particularly as used for pre-processing data from a video capture component such as a "webcam" externally connected to a personal computer via a data pipeline such as a serial connection (e.g., USB-universal serial bus, IEEE 1394, etc.) connection. It is to be understood that a wireless link can also be employed to transmit the camera information where suitable communications hardware and software can be provided. However, it should be appreciated that the system 100 can be adapted for use with any suitable camera or other type of image capture component for capturing static images or dynamic video images, such as a cellular telephone camera, a hand-held camera, or mounted camera, for example.

As illustrated in FIG. 1, the system 100, as employed in a camera, includes an analysis component 102 for computing a motion vector 104 associated with a block within a frame in a video stream. A communications component 106 (e.g., wire or wireless transceiver) communicates the motion vector 104 to a compression engine 108 for estimating motion in the video stream, as will be discussed in greater detail hereinbelow.

As described herein, it is to be appreciated that the analysis component 102 computes a motion vector 104 for each block within the frame in the video stream (e.g., in each "macroblock," a standard 16×16 block of pixels). Motion vectors 104 can be created for each macroblock and supporting kernel, in order to produce a "motion estimation field" for each video frame generated by the webcam.

Figure 2:
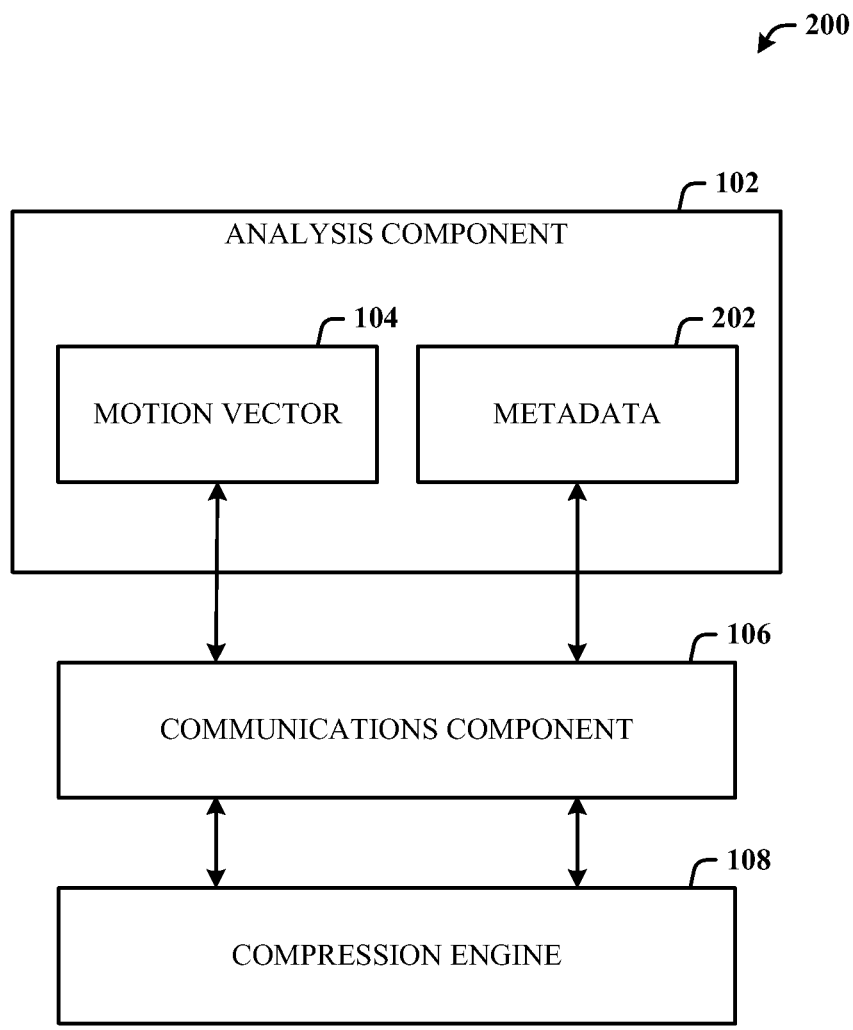
FIG. 2 illustrates an alternative embodiment of a computer-implemented system for processing digital data.

An alternative embodiment is illustrated in accordance with a system 200 of FIG. 2 in which the analysis component 102 also computes metadata 202 associated with the motion vector 104. The communications component 106 communicates both the motion vector 104 and the associated metadata 202 to the compression engine 108. The metadata 202 is associated with the motion vector 104 and is produced internally by a video capture component (e.g., a webcam, camera, etc.). The motion vector 104 for a frame in a video stream and its associated metadata 202 are then transmitted to the compression engine 108 so that this information can be integrated into the engine's motion estimation algorithm.

The motion vectors can be delivered as part of a conventional elementary stream (e.g., MPEG-2, H.263, H.264, VC-1), and the metadata can be delivered either on the side or multiplexed with the video elementary stream at the transport layer. The minimum of this metadata is a table described hereinbelow, which defines the quality bars (can be done implicitly) and the quality rating for each vector.

Figure 3:
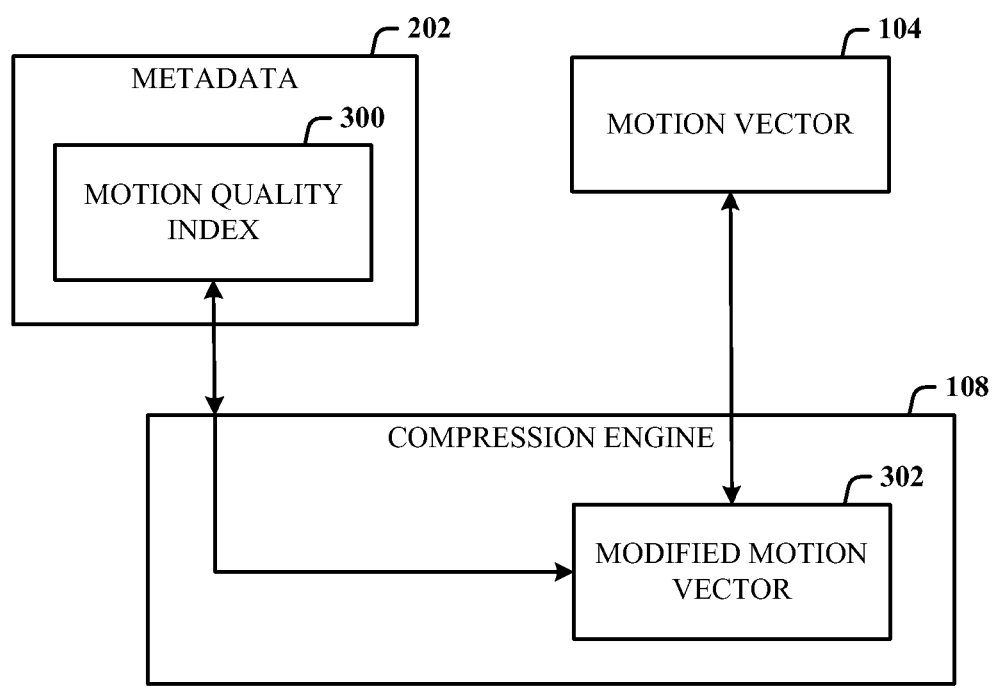
FIG. 3 illustrates exemplary aspects of a compression engine as used with a computer-implemented digital data processing system.

FIG. 3 illustrates additional exemplary aspects in connection with the compression engine 108. The metadata 202 includes a motion quality index 300 associated with the motion vector 104. This motion quality index 300 defines a ranked set of ranges of average distortion per pixels across corresponding video macroblocks. The compression engine 108 has a capability of modifying the motion vector 104 in response to a selected value from the motion quality index 300, so as to produce a modified motion vector 302 that can be used in realtime video compression (e.g., in the compression engine). A modified motion vector 302 is created in this manner for each macroblock in the video frame. In this manner, each frame of the video stream is compressed in accordance with the pre-processing information generated along with the video frame, thereby improving the speed and quality of video compression.

Figure 4:
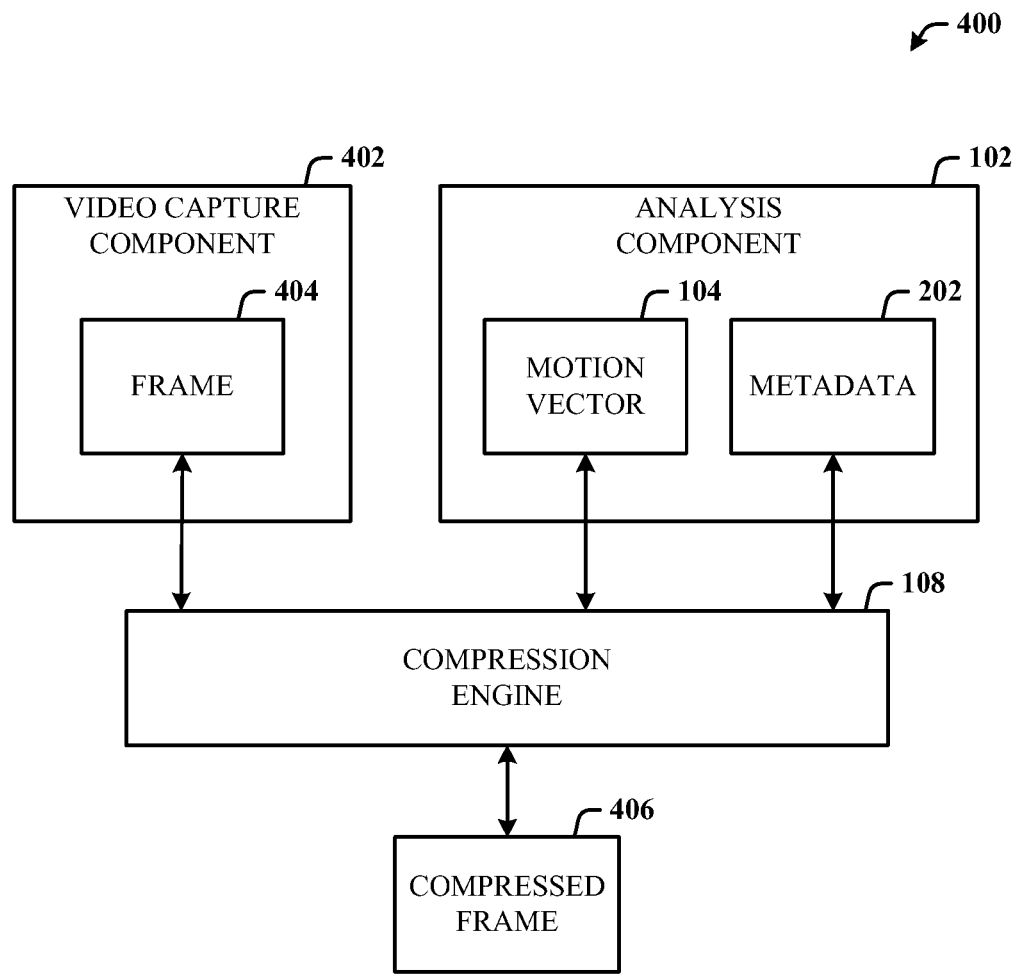
FIG. 4 illustrates a further alternative embodiment of a computer-implemented system for processing digital data.

In yet another alternative embodiment, a computer-implemented system 400 for processing digital data is illustrated in FIG. 4. A video capture component 402 (e.g., webcam, camera, etc.) is provided for generating a frame 404 of a video stream. It is to be appreciated that the video capture component 402 can be a hardware component or a software component that cooperates with suitable hardware, in combination thereof, used for the purpose of capturing digital image data for subsequent processing (e.g., a webcam or the like).

The analysis component 102 computes the motion vector 104 and the metadata 202 representing a motion quality index associated with the motion vector 104. The analysis component 102 can be a distinct component of the video capture component 402 and retained within a common physical housing therewith. The compression engine 108 receives the motion vector 104, the metadata 202, and the frame 404 of the video stream and produces a compressed video frame 406 representing a motion estimate, and having a selected motion quality index value. This is repeated for each macroblock or supporting kernel used to produce a motion estimation field per video frame in the webcam.

Figure 5:
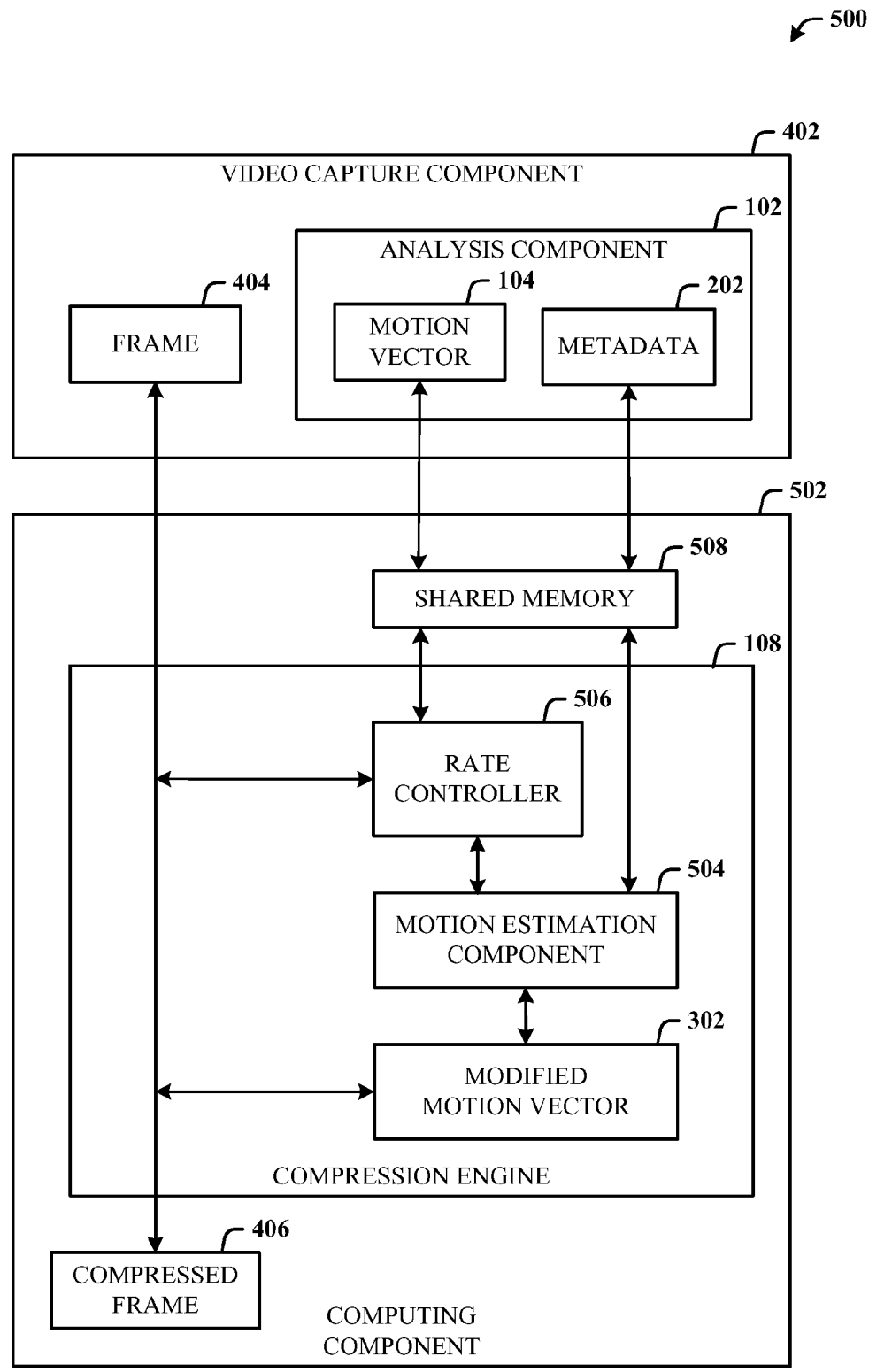
FIG. 5 illustrates an additional alternative embodiment of a computer-implemented system for processing digital data.

In still another alternative embodiment, a system 500 for processing digital data is illustrated in FIG. 5. In this embodiment, the video capture component 402 for generating the frame 404 of the video stream is depicted as a discrete hardware component (e.g., a webcam or the like) for sending the frame 404 via a data pipeline (e.g., a USB connection) to a discrete computing component 502 (e.g., a personal computer, tablet PC, handheld device, etc.) that includes the compression engine 108. The data of each frame 404 in the video stream can be sent separately from the motion vector 104 and metadata 202, or can all be multiplexed together. Again, this can be performed for each macroblock or supporting kernel used to produce a motion estimation field per video frame in the camera.

The video capture component 402 can retain related software components, including the analysis component 102 for performing pre-processing by computing the motion vector 104 and metadata 202 as a part of pre-processing. However, it is to be appreciated that the figures illustrate various aspects of the novel embodiments, and any features depicted in any of the figures can be inferred as being represented in any other respective figures that could be contemplated, all without departing from the disclosed subject matter.

As additionally illustrated in FIG. 5, the compression engine 108 further comprises a motion estimation component 504 for modifying the motion vector 104 according to the metadata 202 to produce the modified motion vector 302. This is repeated for every macroblock or motion estimation kernel used for a video frame produced in the webcam. The modified motion vector 302 is passed from the motion estimation component 504 to the compression engine 108 to the video bit stream for the frame 404, thereby producing the compressed frame 406.

A rate controller 506 selectively controls whether the motion vector 104 is sent directly to the compression engine 108 or first modified by the motion estimation component 504 based on the motion quality index. The motion quality index defines a ranked set of ranges of average distortion per pixel in the frame 404. The rate controller 506 decides how to use the motion vector 104 for each frame 404 in the compression algorithm employed by the compression engine 108, in accordance with the motion quality index.

The rate controller 506 may deem a particular webcam motion vector 104 to be acceptable for use as-is. However, the desired level of motion compression may necessitate modification of the motion vector 104, in which case, the motion vector 104 is passed to the motion estimation component 504 to produce a refined or a more global motion vector.

In one example, the compression engine 108 may decide that the motion vector is of too low quality to use as-is and instructs the motion estimation component 504 to produce the modified motion vector 302 having higher sub-pixel accuracy. In another example, the compression engine 108 may be working with a selected block size and therefore passes the motion vector 104 to the motion estimation component 504 to produce the modified motion vector 302 that matches the level of spatial transform support selected by the rate controller 506.

As also illustrated in FIG. 5, the computing component 502 also includes a shared memory component 508 (e.g., cache memory) for storing the motion vector 104 and the metadata 202 for selective retrieval by the compression engine 108. The motion vector 104 and metadata 202 for a video frame can be stored in the shared memory component 508 to enable the compression engine 108 to selectively pull the motion vector 104 and metadata 202 when needed.

Having described the functions and interactivity of various components in the embodiments hereinabove, a discussion follows of the metadata 202 and the manner in which the metadata 202 can be utilized in order to obtain a desired compression of a frame in a video stream. The metadata is categorized as M0, M1 and M2. M0 metadata represents global metadata transmitted at call setup. M1 metadata indicates frame metadata transmitted at a beginning of the frame. M2 metadata is motion vector metadata of a block associated with the motion vector and transmitted during a call.

The global metadata (M0) can include pixel depth, in which the sampled frame used in motion estimation can be an 8-bit, 12-bit, or 16-bit video sample, for example. The pixel depth complements a quality metrics table (shown below), as follows. The quality metrics table associates a quality index with a residual average pixel distortion for the corresponding macroblock/kernel. The number of quality index values shown below is only one example of a metrics table that can be employed. In other words, more levels can be employed as desired, or fewer levels. A sum of pixel differences is predefined according to a mathematical norm (such as L1 or L2 norm). These residual differences can be classified and mapped to a range of quality index values associated with average distortion per pixel (where the range values represent sample quantization levels as specified in accordance with pixel depth):

| Quality Index Value | Average distortion per pixel |
|---|---|
| 4 (Excellent motion vector quality) | [0-1] |
| 3 (Good motion vector quality) | [1-3] |
| 2 (Average motion vector quality) | [3-7] |
| 1 (Poor motion vector quality) | [7-15] |
| 0 (Bad motion vector quality) | [15-higher] |

The global metadata (M0) can also include a matching norm identifier (ID), which identifies the motion estimation algorithm used by the video capture component 402. An interpolation identifier (ID) identifies an interpolation technique used for sub-pixel motion estimation (e.g., 1 pixel, ½ pixel, ¼ pixel, etc.). Interlace or progressive mode (having an identifier) indicates whether the video capture component 402 produces a progressive or interlaced video, so as to specify a proper frame/field referencing. Frame size (having an identifier) is also indicated, including horizontal and vertical sizes for luminance (also luma) and chrominance (also chroma), and also video sampling ratios (e.g., 4:4:4, 4:2:0, 4:1:1, etc.) to specify the resolution of the luminance and chrominance fields.

The video frame/field metadata (M1) includes a frame/field timestamp, which is a unique timestamp associated with the video frame or field (e.g., SMPTE (Society of Motion Picture and Television Engineers) timestamp, sequence number, RTP (realtime transport protocol) timestamp, etc.)

The motion vector metadata (M2) includes sampling support (e.g., 16×16, 16×8, 8×16, 8×8, 8×4, 4×8, 4×4, etc.). Current video compression standards allow motion estimation to have variable size block support. The shape and size specification of the block is associated with every motion vector produced by the webcam. Position metadata is included, to indicate the position in the frame/field of the upper left corner of the block that the motion vector is associated with. YUV, Y, UV, U, V values are included, so as to indicate a motion vector corresponding to all luma and chroma blocks (YUV), luma block only (Y), for chroma blocks only (UV), or for a single chrominance field (U or V).

The M2 metadata also includes a frame reference (identifier), since current video compression standards allow motion vectors to reference more than the immediately preceding or following video frame. This field is a timestamp delta (positive or negative delta) from current frame time stamp to identify the target frame used for reference. The timestamp delta can also be a positive or negative frame/field count.

A quality index is associated with the motion vector 104, and is used by the rate controller 506 to determine whether the motion vector 104 is to be used as-is or to be modified. The compression engine 108 can decide to not use the motion vector 104 and instead use an intra-encoding block. The motion vector 104 can be used as a seed by the motion estimation component 504 and to produce the modified motion vector 302. The motion vector 104 can be used as-is, but a quantizer can be employed and adjusted to minimize artifacts in the video.

The M2 metadata also includes a standard for sub-pixel accuracy. Current video compression standards allow an option for producing sub-pixel motion estimates (half-pixel or quarter-pixel). This metadata field is used by the compression engine 108 to determine the spatial resolution for the motion vector 104.

In one implementation, the video capture component 402 (e.g., camera, webcam) and the computing component 502 (e.g., laptop) intercommunicate to determine if a higher or lower grade (index) of motion estimation can be employed. For example, since motion estimation can be performed in the computing system, based on the results, the computing component 502 can signal the video capture component 402 that since the vectors being received are "bad" the compression engine can choose to drop the frame or set of frames (skip the frames) so as reduce the computational load for those frame(s), since the quality index is already so poor.

In another implementation, the video capture component 402 and the computing component 502 can communicate to decide how to share the computational load. For example, based on this communication, the video capture component 402 can offload more of the processing to the computing component 402. Alternatively, if the computing component 402 is busy, then the video capture component 402 will be tasked to perform the computations.

The firmware on the camera can be sufficiently intelligent to understand where to spend most of its time and processing power. The firmware can provide this as feedback.

The feedback can also include signals that increase operations that improve the quality metric or reduce the metric, if not required. This can occur in realtime or perhaps the signal would be honored in every 2-3 seconds or 2-3 frames, for example.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
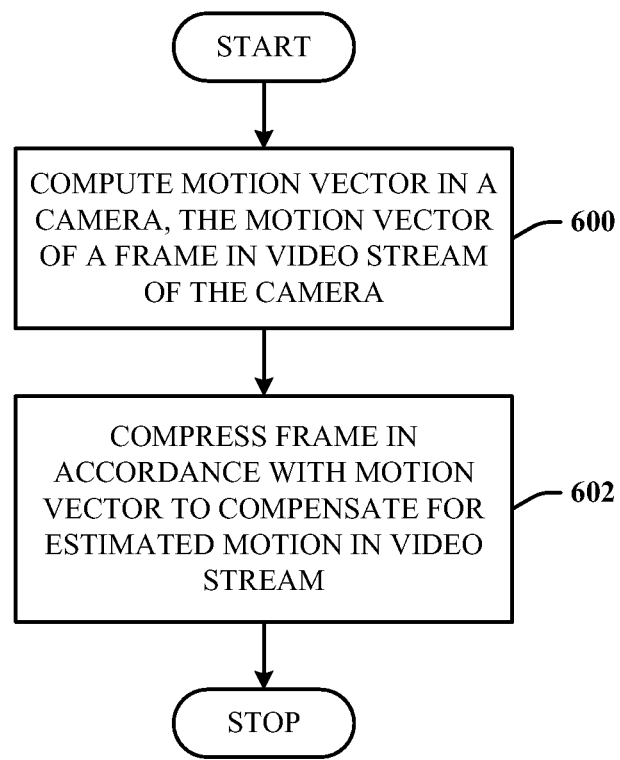
FIG. 6 illustrates an exemplary digital processing method.

FIG. 6 illustrates computer-implemented method of processing digital data. At 600, a motion vector of a frame in a video stream of a camera is computed in the camera. At 602, the frame is compressed in accordance with the motion vector to compensate for estimated motion in the video stream.

Figure 7:
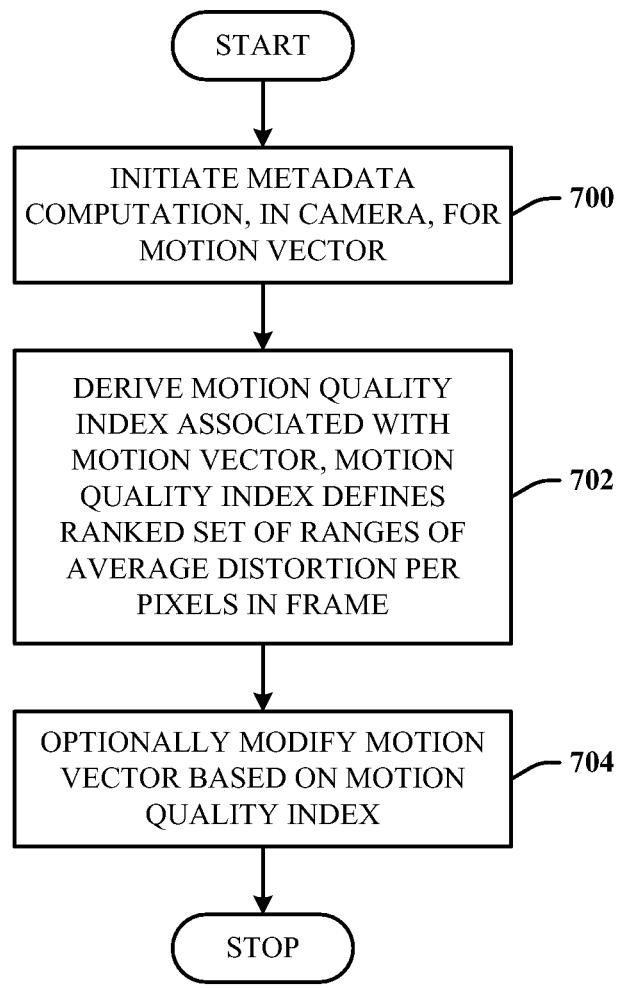
FIG. 7 illustrates further exemplary aspects of a compression operation in a digital processing method.

FIG. 7 illustrates alternative embodiments of the method disclosed hereinabove with respect to FIG. 6. At 700, metadata computation is initiated in a camera for a motion vector. Thus, frame compression is performed in accordance with both the motion vector and the metadata to compensate for estimated motion in the video stream. At 702, the metadata computation can include deriving a motion quality index associated with the motion vector such that the motion quality index defines a ranked set of ranges of average distortion per pixels in the frame. At 704, optionally, the motion vector can be modified based on the motion quality index.

In an alternative embodiment, the webcam produces a compressed video bitstream for the purpose of reducing throughput on the physical connection between the webcam and the PC. Upon decompression of the video, the PC stores the motion vectors 104 for each video frame and inspects the amount of residual information to derive an estimate of the motion estimation quality index for each macroblock or kernel. The motion vectors 104 and motion quality indexes 300 are subsequently re-used in a realtime video compression engine for a realtime communication application as described hereinabove.

Figure 8:
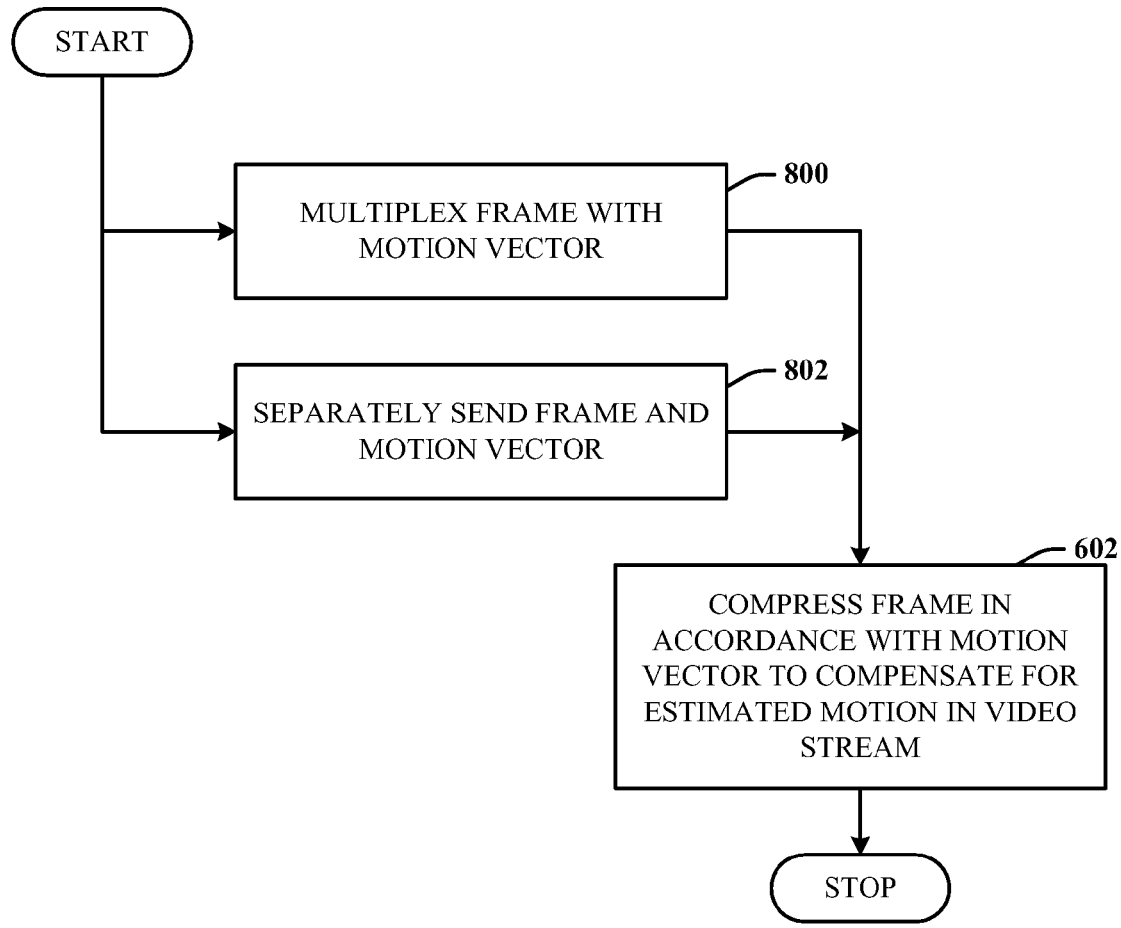
FIG. 8 illustrates additional exemplary aspects of a compression operation in a digital processing method.

FIG. 8 illustrates further alternative embodiments of the method disclosed hereinabove with respect to FIG. 6. At 800, the frame can be multiplexed with the motion vector. Alternatively, at 802, the frame and the motion vector can be sent separately. In either case, the frame is compressed in accordance with the motion vector to compensate for estimated motion in the video stream, as previously indicated at 602 in FIG. 6.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
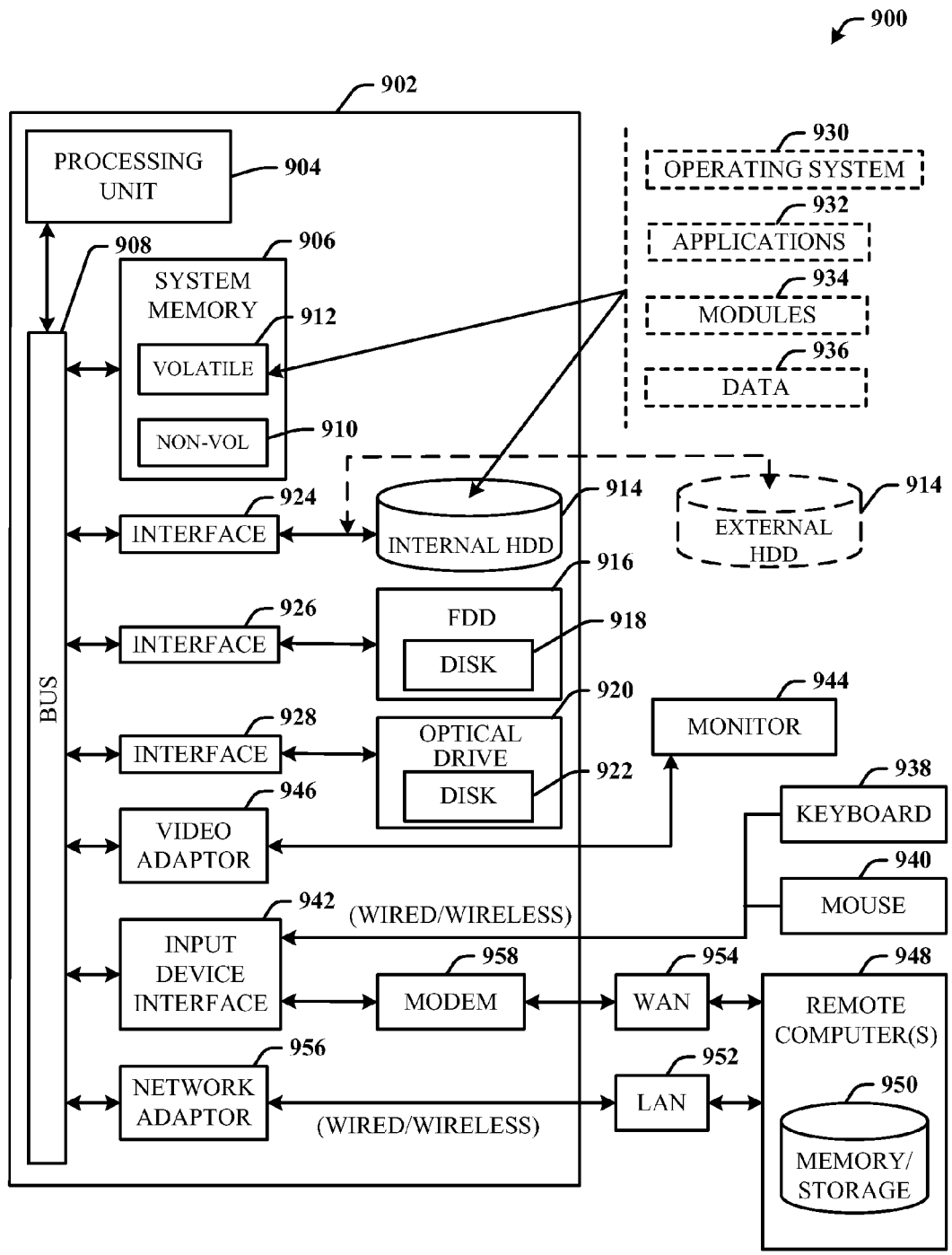
FIG. 9 illustrates a block diagram of a computing system operable to execute digital data processing in accordance with the disclosed architecture.

Referring now to FIG. 9, there is illustrated a block diagram of a computing system 900 operable to execute the computer-implemented digital data processing system 100 in accordance with the disclosed architecture. In order to provide additional context for various aspects thereof, FIG. 9 and the following discussion are intended to provide a brief, general description of a suitable computing system 900 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 9, the exemplary computing system 900 for implementing various aspects includes a computer 902 having a processing unit 904, a system memory 906 and a system bus 908. The system bus 908 provides an interface for system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 can include non-volatile memory (NON-VOL) 910 and/or volatile memory 912 (e.g., random access memory (RAM)). A basic input/output system (BIOS) can be stored in the non-volatile memory 910 (e.g., ROM, EPROM, EEPROM, etc.), which BIOS are the basic routines that help to transfer information between elements within the computer 902, such as during start-up. The volatile memory 912 can also include a high-speed RAM such as static RAM for caching data.

The computer 902 further includes an internal hard disk drive (HDD) 914 (e.g., EIDE, SATA), which internal HDD 914 may also be configured for external use in a suitable chassis, a magnetic floppy disk drive (FDD) 916, (e.g., to read from or write to a removable diskette 918) and an optical disk drive 920, (e.g., reading a CD-ROM disk 922 or, to read from or write to other high capacity optical media such as a DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 912, including an operating system 930, one or more application programs 932, other program modules 934, and program data 936. All or portions of the operating system, applications, modules, and/or data can also be cached in the volatile memory 912. It is to be appreciated that the disclosed architecture can be implemented with various commercially available operating systems or combinations of operating systems.

The aforementioned application programs 932, other program modules 934, and program data 936 can include the computer-implemented digital data processing system 100, the analysis component 102, the motion vector 104, the communications component 106, and the compression engine 108 from FIG. 1, the computer-implemented digital data processing system 200, and the metadata 202 from FIG. 2. The application programs 932, other program modules 934, and program data 936 can also include the components that cooperate with the compression engine 108 as shown in FIG. 3, namely, the motion quality index 300, and the modified motion vector 302. The application programs 932, other program modules 934, and program data 936 can also include the computer-implemented digital data processing system 400, the video capture component 402, the frame 404, and the compressed video frame 406 from FIG. 4, the computer-implemented digital data processing system 500, the computing component 502, the motion estimation component 504, the rate controller 506, and the shared memory component 508 from FIG. 5.

A user can enter commands and information into the computer 902 through one or more wire/wireless input devices, for example, a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, etc.

A monitor 944 or other type of display device is also connected to the system bus 908 via an interface, such as a video adaptor 946. In addition to the monitor 944, a computer typically includes other peripheral output devices (not shown), such as speakers, printers, etc.

The computer 902 may operate in a networked environment using logical connections via wire and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, is connected to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system for processing digital data, the system comprising:
    an analysis component operating within a camera, the analysis component being configured for computing a motion vector of a frame in a video stream captured by the camera and for computing metadata for the motion vector, wherein the metadata comprises a motion quality index associated with the motion vector; and
    a communications component for communicating the motion vector and the metadata from the camera to a compression engine operating within a computing component that is external to the camera, the computing component being configured for compressing, using the compression engine, the frame in the video stream using the motion vector computed in the camera.

2. The system of claim 1, wherein the motion quality index defines a ranked set of ranges of average distortion per pixels for a block of the frame that corresponds to the motion vector.

3. The system of claim 1, wherein the compression engine further comprises a motion estimation component for modifying the motion vector in response to a predetermined motion quality index value.

4. The system of claim 3, wherein the motion estimation component modifies the motion vector by using the motion vector as a seed to produce a refined motion vector.

5. A computer-implemented system for processing digital data, the system comprising:
    a video capture component for generating a frame of a video stream, the video capture component contained within a physical housing;
    an analysis component for computing motion vectors for corresponding blocks in the frame and metadata representing a motion quality index associated with each motion vector, the analysis component contained within the physical housing; and
    a compression engine operating outside of the physical housing, the compression engine being configured for receiving the motion vectors, the metadata, and the frame of the video stream, and for producing a compressed video frame, using the received motion vectors and the metadata, representing a motion estimate having a predetermined motion quality index value.

6. The system of claim 5, wherein the compression engine further comprises a motion estimation component for modifying the motion vectors according to the metadata to produce respective modified motion vectors.

7. The system of claim 5, wherein the motion quality index value defines a ranked set of ranges of average distortion per pixel for a block of the frame that corresponds to the motion vector.

8. The system of claim 5, wherein the video capture component is a webcam for sending the frame via a data pipeline to a computing component comprising at least the compression engine.

9. The system of claim 5, further comprising a shared memory component for storing the motion vectors and the metadata for selective retrieval and re-use by the compression engine for realtime communications between the video capture component and a communications application.

10. The system of claim 5, wherein the metadata further comprises global metadata transmitted at call setup, the global metadata including at least one of pixel depth, a quality metrics table associating the quality index with ranges of average pixel distortion corresponding to the pixel depth, a motion estimation algorithm identifier, a sub-pixel interpolation identifier, a mode identifier, and a frame size identifier.

11. The system of claim 5, wherein the metadata further comprises frame metadata transmitted at a beginning of the frame, the frame metadata including a frame timestamp associated with the frame.

12. The system of claim 5, wherein the metadata further comprises motion vector metadata of a block associated with each motion vector and transmitted during a call, the motion vector metadata including at least one of a shape and size specification of the block, a position value of the block, a chrominance/luminance value of the block, a frame reference identifier, the quality index, and a sub-pixel motion estimate.

13. The system of claim 6, further comprising a rate controller for selectively controlling whether each of the motion vectors is sent directly to the compression engine or first modified by the motion estimation component based on a corresponding motion quality index value contained in the metadata.

14. The system of claim 6, wherein the motion estimation component modifies the motion vector by using the motion vector as a seed to produce a refined motion vector.

15. A computer-implemented method of processing digital data, the method comprising:
    computing, by a camera, a motion vector of a frame in a video stream captured by the camera and computing metadata for the motion vector by deriving a motion quality index associated with the motion vector;
    sending, by the camera, the motion vector, the metadata and the frame to a compression engine that is external to the camera; and
    compressing, by the compression engine, the frame in accordance with the motion vector and the metadata.

16. The method of claim 15, wherein the motion quality index defines a ranked set of ranges of average distortion per pixels for a block of the frame that corresponds to the motion vector.

17. The method of claim 15, wherein the sending is performed by one of (a) multiplexing the frame with the motion vector and (b) separately sending the frame and the motion vector.

18. The method of claim 16, wherein the compressing comprises selectively modifying the motion vector based on the motion quality index.

19. The method of claim 18, wherein modifying the motion vector comprises using the motion vector as a seed to produce a refined motion vector.

* * * * *